United States Patent Office 3,499,170
Patented Mar. 3, 1970

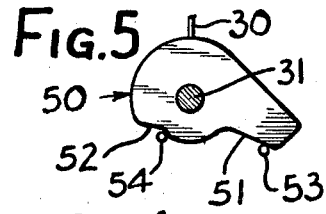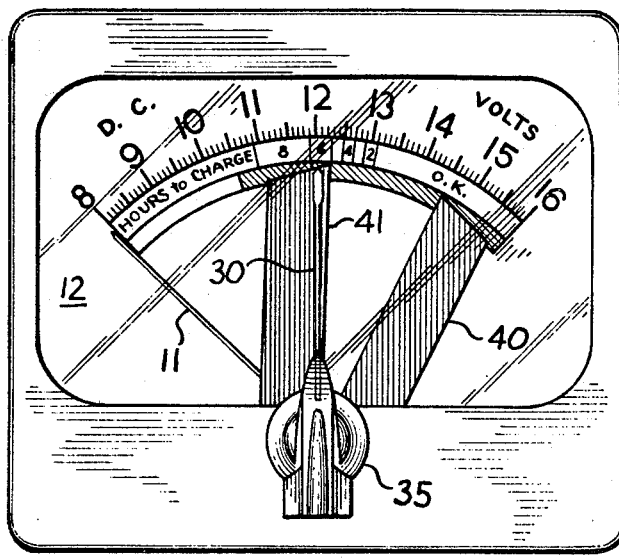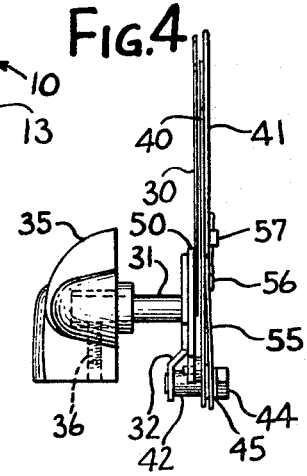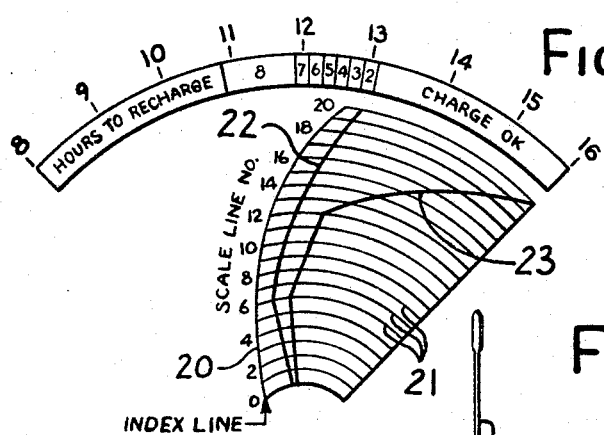

3,499,170
METER DEVICE FOR TESTING STORAGE BATTERIES BY DIFFERENTIAL OPEN-CIRCUIT VOLTAGE ANALYSIS
Vernon C. Westberg, Hampshire, Ill. (% Auto Meter Products, Inc., 22 S. State St., Elgin, Ill. 60121)
Filed Nov. 14, 1967, Ser. No. 682,921
Int. Cl. G01r 11/44
U.S. Cl. 324—29.5                           4 Claims

ABSTRACT OF THE DISCLOSURE

An electrical meter for testing storage batteries by a previously known method of open-circuit voltage analysis. The meter has the conventional face plate and indicator adapted to move across a scale on the face plate in response to an input voltage. A manually settable pointer is mounted for movement across the same scale on the face plate as the indicator, for storing a first meter reading on the face plate. A pair of limit flags are operatively connected to the pointer for movement relative to the pointer, and relative to each other, in response to movement of the pointer so as to set the "good battery" limits for a subsequent meter reading in response to the first meter reading stored by the manual setting of the pointer.

---

The present invention relates generally to the testing of storage batteries of the type used in automotive vehicles and the like, and more particularly, to an improved meter device for testing storage batteries by analysis of differential open-circuit terminal voltages.

Heretofore, a number of different tests and testing devices have been used to determine the condition of storage batteries, including the well known hydrometer test, the cadmium probe test, the carbon pile load test, and many others. More recently, an improved test method has been proposed in which the condition of storage batteries is determined by the analysis of differential open-circuit terminal voltages. This method is described in detail in copending application Ser. No. 440,129, by Chester F. Figg, entitled, "Method and Apparatus for Testing Storage Batteries Utilizing Open-Circuit Voltages After Discharge and Charge," now U.S. Patent No. 3,392,328, which issued July 9, 1968. Although this improved test method offers a number of important advantages over previous test methods from the standpoint of determining the condition of storage batteries of various states of charge, size, temperature, and other variables, it involves a relatively complex meter reading procedure which may tend to confuse field operators in service stations for example, leading to erroneous test results and/or substantial time losses. (After one complete test on a given battery, a repeat test of that battery cannot be made for at least twelve hours.) The complexity of the test procedure may be no problem for a skilled operator who operates the test equipment on a continual basis, and thoroughly understands the test sequence and how to interpret the results, but the operator who conducts the test only a few times a week may waste considerable time in becoming acquainted with the procedure before each test. Moreover, he may operate the test equipment improperly or misinterpret the meter reading on the relatively complex dial arrangement.

It is a primary object of the present invention to provide an improved meter device which facilitates the testing of storage batteries by analysis of differential open-circuit terminal voltages. Thus, a related object is to provide such a meter device which is easy to read and does not rely on the operator's memory.

Another object of the present invention is to provide an improved meter device of the foregoing type which provides a direct reading of "good" or "bad" battery conditions without any correlation or interpretation of different scales by the operator.

It is a further object of the invention to provide an improved meter device of the type described above which provides improved accuracy and maximum efficiency.

Still another object of the invention is to provide such an improved meter device which saves the time of field operators, especially in situations where the operator is not using the device on a continual basis.

Other objects and advantages of the invention will become apparent upon reading the following detailed description and upon reference to the drawings, in which:

FIGURE 1 is a front elevation of a meter device embodying the present invention;

FIG. 2 is an illustration of the scales used on the face of certain prior art meter devices for carrying out the same test method as the meter device in FIGURE 1;

FIG. 3 is an exploded perspective view of the various indicating and control elements associated with the face of the meter device of FIGURE 1;

FIG. 4 is a side elevation of the elements shown in FIGURE 3 in their assembled positions; and FIG. 5 is a plan view of a control cam included in the mechanism shown in FIGURES 3 and 4.

While the invention will be described in connection with certain preferred embodiments, it will be understood that it is not intended to limit the invention to these particular embodiments. On the contrary, it is intended to cover all alternatives, modifications, and equivalent arrangements as may be included within the spirit and scope of the invention as defined by the appended claims.

Turning now to the drawings, and referring first to FIGURE 1, there is shown a D-C volt meter 10 having an indicator 11 which moves across an expanded scale of 8 to 16 volts on the front of a dial plate 12 mounted inside a front frame 13. The movement of the indicator 11 is controlled by a conventional meter circuit (not shown) behind the dial plate 12 in response to the voltage applied across a pair of input terminals on the back of the meter.

In the method described in the aforementioned copending application Ser. No. 440,129, the dial plate of the meter is provided with auxiliary scales of the type illustrated in FIGURE 2 to permit the analysis of differential open-circuit terminal voltages to determine the condition of a battery connected to the meter input terminals. In a typical test procedure, the battery to be tested is discharged for 15 seconds at 50 amps. after which the battery voltage is permitted to stabilize under no load conditions for 5 seconds, and then connected to the meter for measurement of the open-circuit voltage. The test operator observes where the meter indicator crosses the index line 20, and the battery is then disconnected from the meter and charged for 45 seconds. After the charging step, the battery voltage is again permitted to stabilize, by maintaining the battery under no load conditions for 15 seconds, and then again connected to the meter for measurement of the open-circuit voltage. The operator visually follows one of the scale lines 21 from the point where the indicator 11 crossed the index line 20 on the initial reading, across to the indicator position for the second reading. If the indicator at this point falls between a pair of statistically determined reference lines 22 and 23, the battery is "good." If the indicator at this point falls on either side of the area between the two reference lines 22 and 23, the battery is "bad."

As can be seen from the foregoing description, the meter dial used to carry out the differential open-circuit terminal voltage test method heretofore, is relatively complex and can easily lead to erroneous test results and/or lost time on the part of the operator. For example, if the operator does not remember where the meter indicator crossed the index line 20 on the first reading, the entire test must be repeated, after allowing the battery to stand for at least 12 hours. Similarly, the operator may follow the wrong scale line 21, in which case he obtains an erroneous test result. Other sources of error will be readily apparent to one who attempts to follow the test procedure described above.

In accordance with the present invention, an improved meter device is provided with a manually settable pointer for storing the first meter reading on the front of the dial plate, and a pair of limit flags are operatively connected to the pointer and to each other to automatically set the "good battery" limits on the normal meter scale in response to each setting of the pointer. Thus, in the illustrative embodiment, a manually settable pointer 30 is secured to the rear end of a shaft 31 which projects forwardly through a mounting plate 32 secured to the rear side of the meter frame 13 by a pair of screws 33, 34, and on through the meter frame 13 for connection to a manual set knob 35 fixed to the shaft 31 by means of a set screw 36. When the first meter reading is taken, the operator simply turns the knob 33 until the pointer 30 registers with the volt meter indicator 11, and the pointer 30 then remains at this position to store the first meter reading after the battery is disconnected from the meter input terminals.

For the purpose of setting the "good battery" limits on the normal meter scale in response to each setting of the pointer 30, a pair of limit flags 40 and 41 are pivoted on the bottom of the mounting plate 32 and operatively associated with the pointer 30 for controlled movement therewith. More particularly, a pillar 42 is staked to the lower end of the mounting plate 32, with an integral stub shaft 43 projecting rearwardly from the pillar through registering apertures 40a, 41a in the lower ends of the two limit flags 40 and 41. To permit movement of the limit flags 41 and 42 relative to each other, they are independently journaled on the stub shaft 43 and held captive thereon by means of a nut 44 threaded onto the rear end of the stub shaft 43 against a pair of washers 45 on the rear side of the rear flag 41. Consequently, the two limit flags 40 and 41 are free to pivot about the stub shaft 43 relative to both the pointer 30 and each other. In the illustrative embodiment, a pair of semicircular cutouts are formed in the opposed edges of the flags 40, 41 adjacent the rear end of the shaft 31 to insure clearance therefrom during pivotal movement of the flags.

In order to displace the two limit flags 40, 41 angularly in response to displacement of the pointer 30, a cam 50 fixed to the rear end of the pointer shaft 31 forms a pair of cam surfaces 51 and 52 cooperating with a pair of corresponding cam followers 53 and 54 on the limit flags 40 and 41, respectively. In the particular embodiment illustrated, the cam followers 53 and 54 are in the form of pins staked to the limit flags 40 and 41, respectively. To hold the cam followers 53, 54 against the controlling cam surfaces 51, 52, a spring clip 55 is looped around the bottom of the stub shaft 43 and the nut 44 thereon, with opposite ends of the spring 55 bearing against oppositely facing lugs 56 and 57 struck out of the main body portions of the limit flags 40 and 41, respectively. Consequently, the spring clip 55 continuously biases the two limit flags 40, 41 toward each other, thereby urging the corresponding cam followers 53, 54 against the controlling cam surfaces 51, 52 on opposite sides of the stub shaft 43 on which the limit flags are pivoted.

In keeping with the present invention, the cam surfaces 51, 52 are designed to displace the limit flags 40, 41 in accordance with two different predetermined functions of the voltage reading stored by the pointer 30. More particularly, the cam surfaces 51, 52 are designed to displace the limit flags 40, 41 in accordance with the functions defined by the two statistically determined reference lines 22 and 23 illustrated in FIGURE 2. Consequently, for any given setting of the pointer 30, the cam surfaces 51, 52 position the two limit flags 40, 41 at predetermined "good battery" limits on the normal meter scale. Thus, when the second meter reading is taken, the test operator simply observes whether the indicator 11 falls between the two limit flags 40, 41. If it does, the battery is good. If, on the other hand, the meter indicator 11 falls outside the limits represented by the opposed edges of the two limit flags 40, 41, the battery is "bad" and should be replaced.

It will be appreciated that the two cam surfaces 51, 52 automatically set the two flags 40, 41 at the correct "good battery" limit positions (according to the statistically determined reference lines 22, 23) in response to the setting of the pointer 30 to any initial meter reading across the scale of 8 to 16 volts. As can be seen from the reference lines 22, 23 in FIGURE 2, the "good battery" limits are generally expanded as the initial meter reading increases. Similarly, it can be seen from FIGURES 3 and 5 that the gap between the two flags 40, 41 is generally expanded as the pointer 30 is set at increasing voltage levels. At the particular setting illustrated in FIGURE 1, the pointer 30 is set at an initial meter reading of about 12 volts, which corresponds approximately to scale line No. 16 in FIGURE 2. Accordingly, the "good battery" limits for the second meter reading are about 12.3 and 14.5 volts, which are the limits indicated by the flag positions illustrated in FIGURE 2, which in turn are determined by the cam surfaces 51, 52 acting on the cam followers 53, 54. As will be apparent from FIGURE 5, higher settings of the pointer 30 will further expand the gap between the two limit flags 40, 41, thereby expanding the "good battery" limits in accordance with the functions defined by the statistically determined reference lines 22, 23.

As can be seen from the foregoing detailed description, this invention provides an improved meter device which facilitates the tesing of storage batteries by analysis of differential open-circuit terminal voltages. The meter device provided by this invention is considerably easier to read than the complicated multi-scale arrangement of FIGURE 2, and, since the initial meter reading is stored by the manually set pointer 30, it does not rely on the operator's memory. This improved device provides a direct reading of "good" or "bad" battery conditions without any correlation or interpretation of different scales by the operator, and thus provides improved accuracy and maximum efficiency. This improved meter arrangement saves the time of the field operators responsible for conducting the battery test, especially in situations where the operator is not using the device on a continual basis, thereby leading to significant technical and economic advantages.

I claim as my invention:

1. In an electrical meter for use in testing storage batteries and having a face plate and an indicator adapted to move across a scale on said face plate in response to an input voltage applied to the meter, the improvement comprising a manually settable pointer mounted for movement across the same scale on said face plate as said indicator for storing a first meter reading on said face plate, a pair of limit flags operatively associated with said scale and operatively connected to said pointer for movement relative to said pointer and relative to each other in response to movement of said pointer, said flags setting the "good battery" limits for a subsequent meter reading in response to the first meter reading stored by the manual setting of said pointer.

2. An electrical meter as set forth in claim 1 in which said limit flags are responsive to movement of said pointer for movement relative to said pointer in accordance with a predetermined function of the voltage reading stored by said pointer.

3. In an electrical meter for use in testing storage batteries and having a face plate and an indicator adapted to move across a scale on said face plate in response to an input voltage applied to the meter, the improvement comprising a manually settable pointer mounted for movement across the same scale on said face plate as said indicator for storing a first meter reading on said face plate, cam means operatively connected to said pointer for movement therewith, a pair of limit flags mounted for movement across the same scale on said face plate as said indicator and said pointer, cam follower means on each of said flags and operatively associated with said cam means for automatically moving said limit flags in response to movement of said pointer, said cam and cam follower means being adapted to move said flags relative to said pointer in accordance with predetermined functions of the meter readings stored by said pointer so as to automatically set the "good battery" limits for a subsequent meter reading in response to the first meter reading stored by the manual setting of said pointer.

4. An electrical meter as set forth in claim 3 which includes biasing means holding said cam follower means in operative engagement with said cam means.

References Cited

UNITED STATES PATENTS

| 2,514,745 | 7/1950 | Dalzell | 324—29.5 X |
| 3,249,759 | 5/1966 | Sendro | 324—96 X |
| 3,355,593 | 11/1967 | Gately et al. | 324—96 X |

RUDOLPH V. ROLINEC, Primary Examiner

C. F. ROBERTS, Assistant Examiner

U.S. Cl. X.R.

116—129; 324—151, 157